Figure 1:
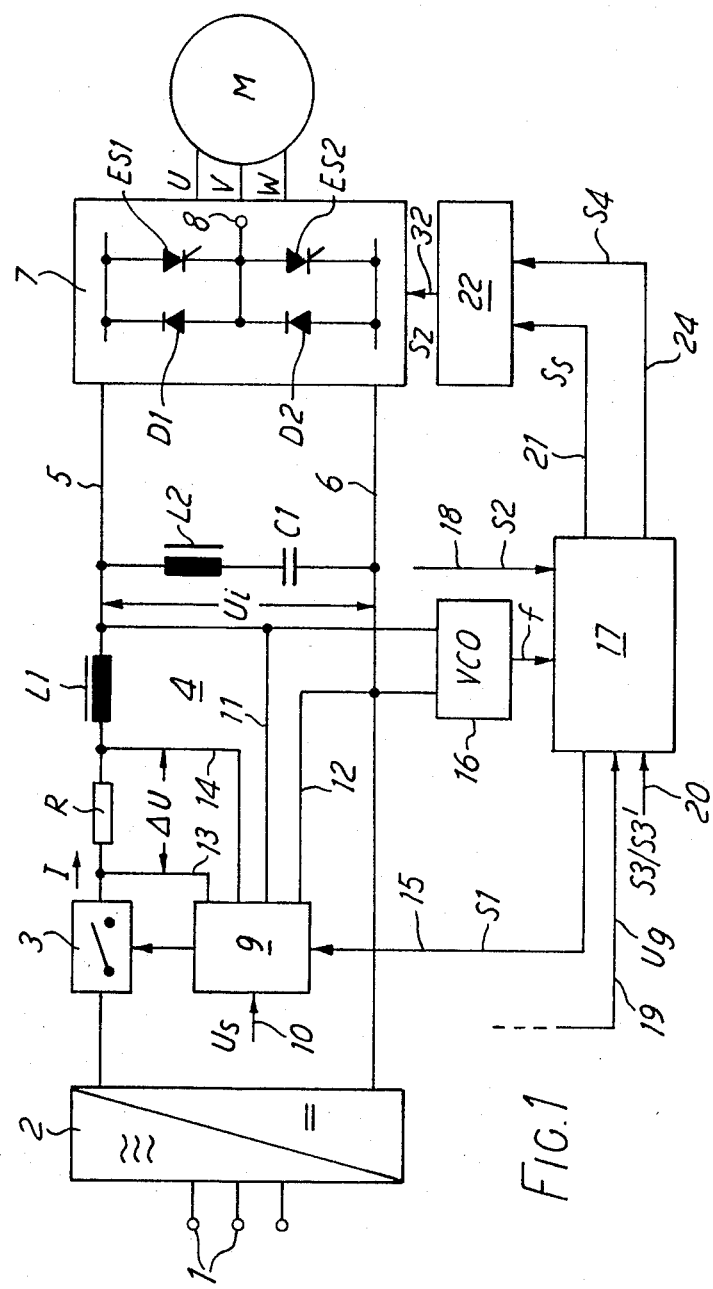

United States Patent [19]

Kückelhahn

[11] Patent Number: 4,514,678
[45] Date of Patent: Apr. 30, 1985

[54] DIGITAL CONTROL DEVICE FOR AN INVERSE RECTIFIER

[75] Inventor: Kjeld Kückelhahn, Nordborg, Denmark

[73] Assignee: Danfoss A/S, Nordborg, Denmark

[21] Appl. No.: 594,254

[22] Filed: Mar. 28, 1984

[30] Foreign Application Priority Data

Apr. 12, 1983 [DE] Fed. Rep. of Germany ....... 3313120

[51] Int. Cl.$^4$ .............................................. H02P 5/40
[52] U.S. Cl. ...................... 318/807; 318/806
[58] Field of Search ............... 308/801, 803, 807–810, 308/798, 806

[56] References Cited

U.S. PATENT DOCUMENTS

| 3,716,775 | 2/1973 | Skogsholni | 318/810 |
| 4,099,109 | 7/1978 | Abbondanti | 318/811 |
| 4,099,225 | 7/1978 | Nygaard | 363/56 |
| 4,139,885 | 2/1979 | Overzet et al. | 363/58 |
| 4,267,570 | 5/1981 | Braun | 363/138 |
| 4,290,108 | 9/1981 | Woehrle et al. | 318/810 |
| 4,295,189 | 10/1981 | Boys | 318/811 |
| 4,348,734 | 9/1982 | Dougherty | 363/41 |
| 4,356,544 | 10/1982 | Ono et al. | 318/811 |
| 4,364,109 | 12/1982 | Okado et al. | 318/811 |
| 4,447,786 | 5/1984 | Saar et al. | 318/811 |

Primary Examiner—David Smith, Jr.
Attorney, Agent, or Firm—Wayne B. Easton

[57] ABSTRACT

The invention relates to a digital control device for an inverse rectifier having controllable switching elements for driving an A.C. motor operable at a variable frequency. The device has a pulse generator for producing timing pulses at a multiple of the frequency of the inverse rectifier frequency and a location counter 26 controlled by the timing pulses. A control store in the form of a ROM has at least two storage zones occupied by different controlling tables of which the data characterizes the periodically changing signal pattern for the ignition and extinction signals of the controlled switching elements of the inverse rectifier. A table selecting apparatus which, depending on setting and operating parameters, delivers a preparatory selecting signal for the desired control table and, after a change in this selecting signal, appropriately switches the storage zone over.

14 Claims, 2 Drawing Figures

DIGITAL CONTROL DEVICE FOR AN INVERSE RECTIFIER

The invention relates to a digital control device for an inverse rectifier, particularly for driving an A.C. motor operable at a variable frequency, comprising a pulse generator producing timing pulses at a multiple of the inverse rectifier frequency, a location counter controlled by the timing pulses, a control store having at least two storage zones occupied by different controlling tables of which the data characterise the periodically changing signal pattern for the ignition and extinction signals of the controlled switching elements of the inverse rectifier, and a table selecting apparatus which, depending on setting and operating parameters, delivers a preparatory selecting signal for the desired control table and, after a change in this selecting signal, appropriately switches the storage zone over.

In a known control device of this kind (DE-AS 23 23 826), an analogue/digital converter is provided which, from parameters such as amplitude, frequency, curve shape, D.C. feed voltage etc. depending on the control condition of the inverse rectifier, preselects a storage zone containing a control table corresponding to this condition. Changing from the actual to the new control table takes place in each case at the end of a counting section. In this case there is the danger that the last signal pattern of the preceding control table and the first signal pattern of the new control table are not in harmony with each other to result in disruptive current surges or even ignition of series-connected load switching elements of the inverse rectifier. In addition, the control table must be switched over extremely rapidly so that the new control table will be fully effective upon commencement of the new counting section. This can result in further errors.

The invention is based on the problem of providing a digital control device of the aforementioned kind which permits a more reliable operation to be obtained.

This problem is solved according to the invention by a synchronising apparatus which delivers a synchronisation pulse when the signal pattern of the actual control table is equal to the signal pattern of the control table to be operated and occurring during switching over, and by releasing apparatus which, on a change in the preparatory selecting signal, makes same effective at the control store only on the occurrence of the synchronisation pulse as an actual selecting signal.

In this control device, no change in the signal pattern occurs at the instant of the change in the control table. Consequently, there is a fully smooth transition to this new curve shape of the inverse rectifier. Since the signal patterns sensibly follow each other within a control table, there will also be a harmonic transition to the next signal patterns. Disruptions by current surges and the like need therefore not be feared. Another advantage is that a comparatively longer time is available for switching the control tables over, namely the entire period during which the equal signal patterns overlap. This again reduces the possibility of the occurrence of errors. For all these reasons, no more stringent requirements are placed on the switching elements during the switching-over process. It is therefore possible to use comparatively simple thyristors.

In a preferred embodiment, the synchronising apparatus comprises a synchronisation outlet associated with the control store. The synchronisation pulse can therefore be obtained by utilising the data occurring in the control store, for example by comparing the actual signal pattern with the one that would be activated during switching over.

However, it is very much simpler if the synchronisation outlet is formed by one of the data outlets of the control store. In this way, it is possible to allocate to one or more locations in the control table an auxiliary bit which releases the synchronisation pulse for a very particular new control table.

In a preferred embodiment, the location counter is associated with a divider which is to be made effective depending on the actual control table, the location counter having a resetting input to which a resetting signal can be fed every time the locations of the actual control table have been run through. In this way, very different curve shapes can be produced for the output voltage of the inverse rectifier. By reason of the reduced number of locations, there is a saving in storage space. Nor is it necessary to use a cyclically operating counter; instead, one can in all cases use the same counter of which the divider can be set to desired values depending on the actual control table.

In particular, a data outlet of the control store may be provided to deliver the resetting signal. It is preferably delivered when the last ignition signal in the ignition sequence has been delivered to the inverted rectifier switching elements. In the simplest case, an auxiliary bit under the last location of a control table is sufficient.

It is also desirable to provide every two interexchangeable control tables with a D flip-flop, to the D input of which one can feed one of two preparatory selecting signals and to the scanning input of which one can feed the synchronisation pulse, its output signal representing the actual selecting signal. The flip-flop ensures that the delivered selecting signal becomes effective as the actual selecting signal only when the synchronisation pulse has occurred.

It is particularly favourable if the table selecting apparatus comprises a detector for the inverted rectifier frequency, the detector delivering a first selecting signal below a predetermined frequency and a second selecting signal above this frequency. The second selecting signal activates a control table with a lower number of locations than for the first selecting signal and a corresponding reduction in the timing pulses. In this way, a change-over in the curve shape can take place in a manner such that the motor is driven with one curve shape from zero up to a predetermined frequency (e.g. 50 to 60 Hz), for example a shape consisting of 5° sections (18 pulse operation), whereas at higher rotary speeds a curve shape with 30° sections is utilised (6 pulse operation). In this way, one can reduce the unavoidable losses in the extinguishing circuits and protective circuits that rise with the frequency.

The detector for the inverse rectifier frequency can for example be a comparator fed on the one hand with a desired voltage and on the other hand with a voltage proportional to the frequency.

In a further embodiment, the table selecting apparatus may comprise a blocking circuit which, upon the occurrence of a command to change the direction of rotation, delivers a changed direction-selecting signal only if the existing voltage of the intermediate circuit falls below a predetermined value. In this way, one ensures that during switching over of the control table, resulting in the motor being supplied with voltage in the opposite direction, no impermissibly high currents will arise.

The blocking circuit may in this case comprise a D flip-flop of which the D input can be fed with one of two direction signals and the scanning input with a releasing signal occurring below the predetermined value, and the output signal of which represents the preparatory direction selecting signal.

To obtain the releasing signal, a comparator may compare the predetermined value directly with the existing voltage of the intermediate circuit or with a voltage derived from the inverted rectifier frequency. This is because this frequency follows the existing voltage and is already available in the control device.

In an inverted rectifier with regulated D.C. voltage supply comprising a D.C. voltage regulator working on the pulse modulation operation and a saturation intermediate circuit, the table selecting apparatus should comprise a blocking circuit which switches over the D.C. regulator on the occurrence of the command to reverse the direction of rotation and switches back to pulse modulation operation only upon the occurrence of the actual new direction selecting signal. By blocking the D.C. voltage regulator, the supply of power from the mains is suppressed. The motor runs correspondingly more slowly so that the intermediate circuit condenser gradually discharges. After a transition period, the intermediate circuit voltage has dropped so far that switching over of the new control table can take place into the other direction of rotation.

In particular, the blocking apparatus may be fed by an exclusive OR circuit to one input of which one can fed one of two direction signals and to the other input of which one can feed the actual direction selecting signal, and the outlet of which delivers a blocking signal when the two input signals differ from each other.

In another embodiment, the control store is followed by a gate which, on the occurrence of an error signal notifying the ignition of two series connected load switching elements of the inverse rectifier, converts the actual signal pattern to a signal pattern in which all the load switching elements have been controlled to the conductive state. If for some reason an ignition short-circuit nevertheless occurs, additional short-circuit paths are connected in parallel to said short-circuit path by way of the other load switching elements. Since thyristors can cope with such a divided short-circuit current for some time, no permanent damage need be feared. Consideration should in this case be given to the fact that the D.C. voltage regulator has in such a case changed to the blocking operation anyway and the short-circuit current therefore drops relatively quickly.

The error signal can for example be delivered by a detector which determines the polarity of the condenser voltage in the intermediate circuit. During ignition, the oscillation of the current results in a reversal in the polarity of the condenser voltage.

The table selecting apparatus advantageously also comprises a detector for the mains voltage that, when the mains voltage drops below a predetermined value, delivers an extinction selecting signal which, independently of a synchronisation pulse, activates a programme extinguishing the load switching elements. This ensures that errors in controlling the load rectifier and bringing about ignition will not occur as a result of insufficient operating voltage within the control device and consequently defective operation of the counter, the control store and the like.

In particular, a D flip-flop can be used, to the D input of which one can feed the preparatory extinction selecting signal and to the scanning input of which one can feed a scanning pulse from the output of the location counter, its output signal representing the actual extinction selecting signal.

Further, a time generator is advisable which can be actuated by the actual extinction selecting signal, has its own voltage supply, and is connected to a blocking input of the ignition and extinction signal amplifier controlled by the data of the control store. This time generator, which remains active even if the mains fail, ensures that the signal amplifier becomes inactive when the voltage supply in the rest of the control device drops to impermissibly low values, which could result in wrong trigger pulses.

Figure 2:
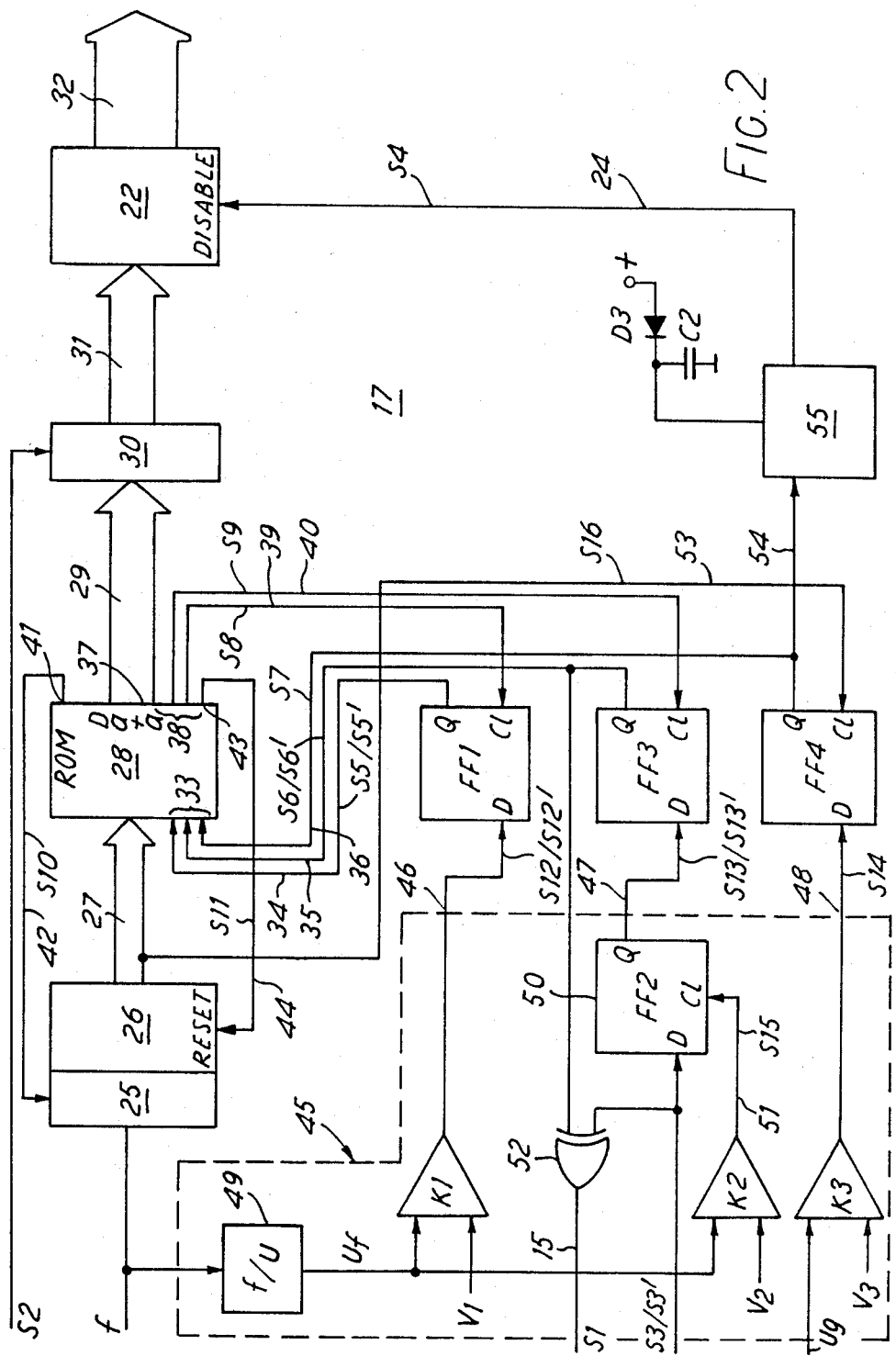

A preferred example of the invention will now be described in more detail with reference to the drawing, wherein:

FIG. 1 is the circuit diagram of an inverse rectifier for controlling an A.C. motor with the control device of the invention, and FIG. 2 is the block circuit diagram of this control device.

In FIG. 1, a three-phase bridge rectifier 2 connected to an A.C. mains 1 fed by way of a D.C. voltage regulator 3 a smoothing intermediate circuit 4 which comprises a longitudinal choke L1 and the series circuit of a transverse choke L2 and a condenser C1. In this way, one obtains a supply line 5 at positive potential and a supply line 6 at negative potential. These supply lines are connected to an inverse rectifier 7 which has for each phase two series-connected load switching elements Es1 and Es2, e.g. thyristors, and two series-connected oppositely poled recovery diodes D1 and D2. The junctions each form a phase connection 8. The three phase conductors U, V, W lead to a three-phase motor M.

The D.C. voltage regulator 3 is an electronic chopper which normally works in pulse modulation operation but can also be switched to blocking operation in which the intermediate circuit 4 is separated from the mains 1. To control the D.C. voltage regulator 3, there is a voltage control circuit 9 which is fed with a desired value $U_s$ by way of an input 10 and the existing value $U_i$ of the intermediate circuit 4 by way of the lines 11 and 12. In addition, the voltage drop $\Delta U$ is tapped at a measuring resistor H in the supply line 5 and fed to the voltage control circuit 9 by way of the lines 13 and 14. The D.C. voltage regulator can therefore be so regulated that the existing voltage $U_i$ corresponds to the desired value $U_s$, that the current I flowing to the inverse rectifier 7 is constant or that both dependent quantities can be taken into consideration. In addition, a blocking signal S1 can be fed by way of a line 15 to switch the D.C. voltage regulator 3 over to the blocking operation.

As a pulse generator for the inverse rectifier frequency F, there is a voltage controlled oscillator which is influenced by the existing voltage $U_i$ of the intermediate circuit 4 and therefore feeds to a control device 17 timing pulses in the form of a frequency signal f which follows the existing voltage $U_i$. The frequency f amounts to a whole number multiple of the desired inverse rectifier frequency F, for example $f = 72 \times F$. By way of a line 18, the control device 17 is fed with an error signal S2 which occurs when the condenser C1 assumes negative potential. By way of a further line 19, a voltage signal $U_g$ is supplied which corresponds to the constant D.C. voltage behind the rectifier 2. A signal S3/S3′ termining the direction of rotation of motor M can be introduced at the inlet 20. An output line 21 transfers control signals $S_s$ to signal amplifiers 22 which deliver ignition and extinction signals $S_z$ at their output 23 to the switching elements of the inverse rectifier 7. A further line 24 permits a blocking signal S4 to be applied to the dissable input of the signal amplifier 22.

According to the construction of the control device 17 shown in FIG. 2, the frequency signal f is fed by way of a divider 25 to a location counter 26 which controls respective locations in a control store 28 by way of a septenary conductor 27. The control store is in the form of a ROM and gives signal patterns to a gate 30 by way of a 14 times conductor 29. The gate can be influenced by the error signal S2 in such a way that instead of the signal pattern supplied by way of the line 29, a pattern occurs such that all load switching elements Es1, Es2 of the inverse rectifier 7 are ignited. The signal pattern delivered by the gate 30 is transmitted by way of a 14 times conductor 31 to the signal amplifier 22 which is finally adapted by way of a multiple line 32 to supply all switching elements of the inverse rectifier with ignition pulses or extinction pulses (=ignition pulses of the extinction switching elements). For example, the inverse rectifier 7 possesses six load thyristors, six associated extinction thyristors, two swing-over thyristors and possibly two further braking thyristors.

In the control store 28, several control tables are stored in different storage zones, the tables being selected by the actual selecting signals S5 and S5′ or S6 and S6′ or S7 which are applied to the selecting inputs 33 and supplied by way of the lines 34, 35 and 36. These selecting signals which are associated in pairs are represented by a respective H value or L value. By controlling the individual locations of the control tables, the signal patterns stored therein are delivered by way of the data output 37. Data outputs 38 serve to deliver synchronisation pulses S8 and S9 by way of lines 39 or 40, respectively. A data output 41 is connected by way of a line 42 to the divider so that the latter can be set by means of a divider signal S10 to the divider condition corresponding to that of the control table. Another data output 43 is connected by a line 44 to the resetting input of the location counter 26 so that the latter is set to zero on the occurrence of a resetting signal S11.

A table selecting apparatus 45 comprises a plurality of outlets 46, 47 and 48 by way of which the selecting signals S12 and S12′ or S13 and S13′ or S14 can be delivered. The frequency signal f which is porportional to the inverse rectifier frequency is converted to a voltage $U_f$ by way of a frequency-voltage converter 49. This voltage is compared in a comparator K1 with a reference voltage V1. If the inverse rectifier frequency is under 50 Hz, one obtains the preparatory selecting signal S12 and if the frequency is higher than same, one obtains the preparatory selecting signal S12′. The respective selecting signal is applied to the D input of a flip-flop FF1. The scanning input C1 thereof is supplied with the synchronisation pulse S8. AT the outlet Q, the actual selecting signals S5 or S5′ corresponding to the output signal S12 or S12′ are then fed to one of the selecting inputs 33 from the respective instant of synchronisation.

The rotation direction signal can likewise assume two values S3 and S3′ and is fed to the D input of a flip-flop FF2 which forms a blocking circuit 50. Its scanning input C1 is influenced by a releasing signal S15 by way of a line 51 when a comparator K2 has determined that the voltage $U_i$ is less than a reference value V2. The command to change the direction of rotation is therefore delivered by the table selecting apparatus 45 as a preparatory direction selecting signal S13 or S13′ only when the voltage of the intermediate circuit and thus the rotary speed of motor M is correspondingly low. These selecting signals S13 or S13′ are transmitted delayed as actual selecting signals S6 or S6′ by a D flip-flop FF3 upon the occurrence of the synchronisation pulses S9 in a manner similar to that described in conjunction with the selecting signal S12/S12′.

The rotation direction signal S3/S3′ is also applied to the one input of a blocking circuit 52 is the form of an exclusive OR element of which the other input is supplied with the actual selecting signal S6 or S6′. When the rotation direction signal changes, the blocking signal S1 which switches the D.C. voltage regulator 3 over to the blocking operation occurs at the output 15 of the exclusive OR element so that the motor slows down and the existing voltage $U_i$ of the intermediate circuit 4 gradually decreases, the inverse rectifier frequency also dropping in the illustrated circuit. Upon dropping below a predetermined value, the releasing signal S15 is produced and a change is brought about in the preparatory selecting signal at the output 47. If, now, on the occurrence of the synchronisation pulse S9 the actual selecting signal S6 or S6′ is produced, the blocking signal S1 disappears so that the D.C. voltage regulator 3 can work normally upon running up in the opposite direction of rotation.

A comparator K3 compares the D.C. voltage $U_g$, which corresponds to the output voltage of the bridge rectifier 2, with a reference voltage V3. Upon dropping below a predetermined value, the extinction signal S14 is produced at the output 48 and fed to the D input of a further D flip-flop FF4. The scanning input C1 thereof is supplied by a line 53 with timing pulses S16 from the output of the location counter 26 so that, shortly after the occurrence of the preparatory extinction selecting signal S14, the actual extinction selecting signal S7 occurs at the output Q.

The output Q of the flip-flop FF4 is connected by a line 54 to a time generator 55 which, as is represented by a condensor C2 and a diode D8, comprises a voltage store and can therefore still remain active for some time even upon failure of the mains voltage. It may also be fed by a battery. This time generator 55 delivers by way of the line 24 the blocking signal S4 to the disable input of the signal amplifier 22 so that the delivery of ignition signals is safely prevented.

If the motor M is operated at a low frequency (below 50 Hz), by appropriately setting the desired value $U_s$, the actual control table receives signal patterns which in each phase produce a voltage curve composed of 72 5° sections. Per half wave, this corresponds to an 18 pulse operation as for example described in our prior Application P 32 19 751.9-32. The control table comprises 72 locations. The frequency signal f is greater by the factor 72 than the inverse rectifier frequency F. At an inverse rectifier frequency of 50 Hz, therefore, f=3600 Hz. Apart from the data for the signal pattern, the control table also contains data for the synchronisation pulses S8, the divider signal S10 and the resetting pulse S11.

As soon as the inverse rectifier frequency exceeds 50 Hz, the actual control table is to be replaced by a new control table of which the signal patterns are so selected that the same operating condition is maintained for every 30°. Such a 6 pulse operation requires a divider signal S10 so that the divider 25 divides the frequency signal f by six and a resetting signal S11 so that the counter 26 is reset not after 72 but already after every 12 locations. This table likewise comprises an auxiliary bit which is adapted to deliver the synchronisation pulse S8 at the correct instant. The time position of the synchronisation pulses is selected so that the same signal pattern is always present at both control tables during switching-over to the new control table as well as during resetting to the preceding control table.

If a command S3 is given to reverse the direction of rotation, the motor speed drops by reason of delivery of the blocking signal S1. After a certain time, the preparatory direction selecting signal S13 is changed to S13' and, after arrival of the synchronisation pulse, is transmitted as the actual selecting signal S6'. The now effective control table corresponds to the previously mentioned 18 pulse curve from but allows the load switching elements to become effective in a different sequence. In this direction of rotation, it is likewise possible to switch to a 6 pulse operation at higher inverse rectifier frequencies.

Upon a drop in the mains voltage, e.g. if the mains fail, response of the flip-flop FF4 causes delivery of the actual extinction selecting signal S7 with the result that the now actual control programme extinguishes all load switching elements. At the same time, the time generator 55 ensures that the signal amplifier 22 will no longer delivery ignition pulses. This ensures that there will be no wrong control in the inverse rectifier. As already mentioned, with the aid of the error signal S2 by way of the gate 30 one can also ensure that all load switching elements are simultaneously brought to the conductive state to reduce a short-circuit current rapidly.

Of course it is also possible to have more than the described five control tables deposited in the control store 28. Instead of the 18 pulse and 6 pulse curve shapes mentioned by way of example, one can also consider any other curve shapes approximating a sinusoidal form in the interlinked operation.

I claim:

1. A digital control device for an inverse rectifier having controllable switching elements for driving an A.C. motor operable at a variable frequency, comprising, (a) pulse generator means for producing timing pulses at a multiple of the frequency of said inverse rectifier, said pulse generator means including divider means, a (location) counter controlled by said timing pulses, a control store having at least two storage zones occupied by different control tables having control data for generating periodically changing signal patterns for the ignition and extinction signals for said controllable switching elements, table selecting apparatus responsive to setting and operating parameters for effecting the switching between two control tables of said control store for each one of said parameters, synchronizing means for clocking said table setting apparatus to effect switching of said tables only on the completion of the signal pattern generated by the related table, said table selecting apparatus including a detector of the frequency of said inverse rectifier and operating to deliver a first selecting signal below a predetermined frequency and a second selecting signal above said frequency, said synchronizing means being operative to set the modulo for said divider means depending on said predetermined frequency and being operative to reset said counter every time the locations of an actual control table are run through, said second selecting signal operating to activate a control table having a lower number of memory locations than for the first selecting signal and a corresponding reduction of said timing pulses.

2. A control device according to claim 1 characterized in that said synchronizing means has a synchronization outlet associated with said control store.

3. A control device according to claim 2 characterized in that said synchronization outlet is one of the data outlets of said control store.

4. A control device according to claim 1 characterized in that a data outlet of said control store is provided to reset said location counter.

5. A control device according to claim 1 characterized in that said table setting apparatus includes a D flip-flop for every two interchangeable ones of said control tables with the D input thereof fed by one of said setting and operating parameters and its scanning input fed by said synchronization means and its output selecting signal is fed to said control store.

6. A control device according to claim 1 characterized in that said detector for said inverse rectifier frequency is a comparator fed by a desired voltage and a voltage proportional to the frequency.

7. A control device according to claim 6 wherein said table selecting apparatus includes a direction detector of a selected direction of rotation of said inverse rectifier, said table selecting apparatus including a blocking circuit which on the occurrence of a signal to reverse said direction of rotation delivers a changed preparatory direction selecting signal only when said voltage proportional to said frequency falls below a predetermined value.

8. A control device according to claim 7 wherein said blocking circuit includes a predetermined minimum frequency detector, said clocking circuit including D flip-flop to the D input of which one of two reversing signals can be fed and to the scanning input of which there can be fed the output of said frequency detector for a predetermined minimum frequency and of which the output signal represents said preparatory direction selecting signal.

9. A control device according to claim 8 characterized in that said predetermined minimum frequency detector is a comparator which compares a voltage corresponding to said predetermined minimum frequency with a voltage derived from said inverse rectifier frequency.

10. A control device according to claim 1 including a D.C. voltage regulator working in pulse modulation operation and a smoothing intermediate circuit, said table selecting apparatus including a clocking circuit which on the occurrence of a signal to reverse the direction of rotation of said rectifier switches said D.C. regulator to blocking operation and only switches back to the pulse modulation operation upon the occurrence of a new direction selecting signal.

11. A control device according to claim 7 characterized in that said blocking circuit includes an exclusive OR circuit to which one input thereof is fed said signal to reverse and to the other input thereof is fed said signal to reverse and the output of which delivers a blocking signal if said two input signals depart from each other.

12. A control device according to claim 1 including gate means following said control store having control outputs connectable to said controllable switching elements, said gate means having an input for receiving an error signal and being operative upon the occurrence of an error signal of two series connected load switching elements (Es1, Es2) of the inverse to convert the signal pattern of said control outputs to a signal pattern in which all of said load switching elements are switches to the operative state.

13. A control device according to claim 1 including a voltage regulator with output supply lines, an intermediate circuit connected to said supply lines including a capacitor across said supply lines, and means for determining a change in polarity of said capacitor for generating said error signal.

14. A control device according to claim 1 wherein said table selecting apparatus includes a supply voltage detector, said supply voltage detector being operative upon a drop in the supply voltage below a predetermined value to deliver a preparatory extinction selecting signal which independently of any synchronization pulse activates a program extinguishing said load switching elements.

* * * * *